US008113262B2

(12) United States Patent
Gillis

(10) Patent No.: US 8,113,262 B2
(45) Date of Patent: Feb. 14, 2012

(54) ACCESSORY FOR WAND FOR WINDOW TREATMENT BLINDS

(76) Inventor: Robert David Gillis, Wilmington, NC (US)

( * ) Notice: Subject to any disclaimer, the term of this patent is extended or adjusted under 35 U.S.C. 154(b) by 481 days.

(21) Appl. No.: 11/805,530

(22) Filed: May 23, 2007

(65) Prior Publication Data

US 2008/0289781 A1 Nov. 27, 2008

(51) Int. Cl.

| | |
|---|---|
| ***E06B 9/00*** | (2006.01) |
| ***A47H 7/00*** | (2006.01) |
| ***A47B 95/02*** | (2006.01) |
| ***A47J 45/00*** | (2006.01) |
| ***B65D 25/28*** | (2006.01) |
| ***E05B 1/00*** | (2006.01) |
| ***E05B 7/00*** | (2006.01) |

(52) U.S. Cl. ................. 160/178.1 R; 160/405; 16/111.1

(58) Field of Classification Search ................. 16/110.1, 16/111.1, 422, 426, 430, DIG. 19, DIG. 41; 160/176.1 R, 178.1 R, 405; 362/399; 74/543, 74/548

See application file for complete search history.

(56) References Cited

U.S. PATENT DOCUMENTS 4,607,974 A 8/1986 Brothers et al. ................ 403/24
4,759,398 A 7/1988 Renee ........................ 160/178.1
5,127,458 A 7/1992 Schaefer et al. ........... 160/168.1
5,476,132 A 12/1995 Jacobson ................... 160/168.1
D373,945 S 9/1996 Chang .............................. D8/83
5,553,649 A * 9/1996 Chisaka et al. ........ 160/168.1 R
D384,565 S 10/1997 Lin ................................. D8/83
5,709,465 A * 1/1998 Lanzone ....................... 362/400
5,787,953 A 8/1998 Jacobson ............... 162/168.1 R
D398,508 S 9/1998 Thompson et al. .............. D8/83
5,837,038 A * 11/1998 van der Maas .................. 96/101
5,909,535 A * 6/1999 Curwick et al. .............. 392/476
D420,559 S 2/2000 Chang .............................. D8/83
6,044,890 A 4/2000 Renee ........................ 160/177 R
6,089,303 A 7/2000 Metcalf et al. ............ 160/177 R
6,298,897 B1 * 10/2001 Metcalf et al. ............ 160/177 R
6,752,730 B1 * 6/2004 Brine et al. ................... 473/513
6,805,186 B1 * 10/2004 Nien ......................... 160/177 R

* cited by examiner

*Primary Examiner* — David M Purol
*Assistant Examiner* — Jeremy Ramsey
(74) *Attorney, Agent, or Firm* — Michael E. Mauney

(57) ABSTRACT

An accessory wand handle for use on existing control wands. An elongated handle with a bore is fitted over the end of an existing wand for blinds. The handle is secured on the existing wand by a frictional fit between the outside surface of the existing wand and the inner surface of the bore in the accessory wand handle. The wand handle is larger than a wand to provide a mechanical advantage for users to turn the wand. The wand handle itself can be constructed to compliment the appearance of the wand. There is sufficient space between the wand and the walls of the bore for placement of decorative items. The handle itself may be decorated or inscribed with logo or other promotional materials.

9 Claims, 5 Drawing Sheets

ACCESSORY FOR WAND FOR WINDOW TREATMENT BLINDS

FIELD OF THE INVENTION

This invention relates to wands used for operating the rotatable drive for a blind used to cover windows. More specifically, it involves an accessory that adjustably fits over wands of different sizes for different types of blinds to provide easier operation of the wand control and blind, to improve the appearance of the wand control, and to allow expression of individual decorating taste by an owner of the blind.

BACKGROUND OF THE INVENTION

A wide variety of materials are used to provide coverings for windows. The purpose of these coverings is to control the amount of light entering the window and also to provide greater privacy for someone inside a room equipped with window coverings. These can include movable drapes, retractable shades, and various types of blinds. Blind coverings ordinarily consist of slats. These slats are a variety of widths from several inches to less than an inch. The slats may be vertically mounted or they may be horizontally mounted. The vertical blinds generally open by sliding back into compact bundles at the vertical sides of a window so equipped. The horizontal blinds usually hang from cords and may be raised or lowered by pulling the cords. In the fully raised position the slats are in a tight bundle at the top of the window. When the catch on the cord is released, gravity pulls the blinds downward. The metal slats comprising the blinds hang in a spaced relationship with each other. In addition to the capacity to manipulate the blinds to open and close, these blinds are also equipped with a rotary drive so that orientation of the metal slats relative to the window can change to cover the window or to uncover the window. For a vertical blind, the uncovered position is when the slats are oriented perpendicular to the window on which they are mounted. The same is true for the horizontal blinds. In a covered position, the blinds are rotated through the rotatable drive mechanism so that the slats are approximately parallel to the surface of the window. If in the covered position, the blinds form an opaque covering unless the materials of which the blinds are made are translucent. Closing the blind and rotating them into the covered position effectively shuts out most of the light from the outside and provides greater privacy for the room where the window is located.

Ordinarily, the control which adjusts the orientation of the slat material of the blind to the window on which they are mounted is called a "wand." This wand is a generally cylindrical rod-like device which hangs on the control for the rotatable drive of the blind. Because the blinds are ordinarily mounted at the top of the window, the wand hangs vertically from the point of mounting of the blind on the window to a height where it can be easily reached and adjusted by a user of the blind. By rotating the wand, a rotatable drive in the blind mechanism is rotated and this adjusts the orientation of an individual slats of the blind to the window allowing for control of the amount of light and the amount of visibility into the room through the window to the outside.

Because the user would like the window to remain as unobstructed as possible, the wands themselves are ordinarily placed at one corner of the blind where they hang as unobtrusively as is consistent with their functional requirements. Wands are frequently made of a translucent plastic material, though wooden ones are also found on occasion, especially for blinds where the slat materials are made of wood. The wand is ordinarily relatively small in diameter. The most common sizes are 3/8 inch or 5/16 inch, although on occasion wands as thick as 1/2 inch are seen. However, the need to have the wand as visually unobtrusive as possible conflicts with the functional need of having a wand that may be easily operated. A variety of alternative means of rotating the wand have been proposed. Wands with actuators have been proposed by Jacobson, U.S. Pat. No. 5,787,953. A similar system is seen in Metcalf et al, U.S. Pat. No. 6,298,897 and in an earlier Jacobson patent, U.S. Pat. No. 5,476,132. Metcalf et al U.S. Pat. No. 6,089,303 poses a control system for a wand including slidably longitudinal component parts which allows the wand to be rotated with a short linear stroke of one component of the wand control system.

Some of these, especially the Metcalf '303 patent recognize that manipulating a wand may be difficult for people with impairments in their hands. Manipulation of the small control rod with the fingers can be a trying experience for someone with significant arthritis in the fingers. However, despite this earlier work, there is an unmet need for an accessory for wand systems which do not require replacement of the original wand on a blind. The accessory can be readily used to make manipulation and control of the wand easier for people with impairments and also provides a way of expressing decorative ideas of the owners of the wand system thereby increasing the utility of the wand system so that it not only controls the operation of the blinds, but also itself may be a decorative item.

SUMMARY OF THE INVENTION

The current invention is a device designed to adapt to and fit over an existing wand. It will ordinarily consists of a handle-like component with a tapering bore within the handle. The bore tapers from a relatively larger diameter at the opening of the bore to a smaller diameter as the bore extends into the handle-like device. The device is fitted to an existing wand system by placing a wand within the bore in the device and moving the handle upwardly on the wand forcing the wand into the bore to where the bore is approximately the size as the wand itself. The interior of the handle-like device is constructed of a material with a sufficient coefficient of friction so that as the wand is placed into the device it will cause a secure frictional fit within the bore, fixing the handle on the wand and securing the handle in place on the wand against gravity. The handle device may be a variety of shapes, but at least a portion of the handle-like device will be significantly larger in diameter than the wand itself. This allows a user to securely grip the device in the palm of the user's hand or even to use two hands to rotate the handle-like device to rotate the wand to control the rotatable drive of the blind. In one embodiment of the current invention it will be a generally cylindrical truncated cone in appearance with the portion of the device, where the bore originates, having a flared opening. This flared opening leaves an unused space within the bore between the wand and the walls of the bore, when the wand is fixed within the device. This makes it possible for an individual to mount decorative items within this space which could include seasonal things such as miniature Christmas trees, miniature lilies for Easter, pumpkins for Thanksgiving or Halloween, and so on.

DETAILED DESCRIPTION OF THE DRAWINGS

Figures 1, 1A, 1B:
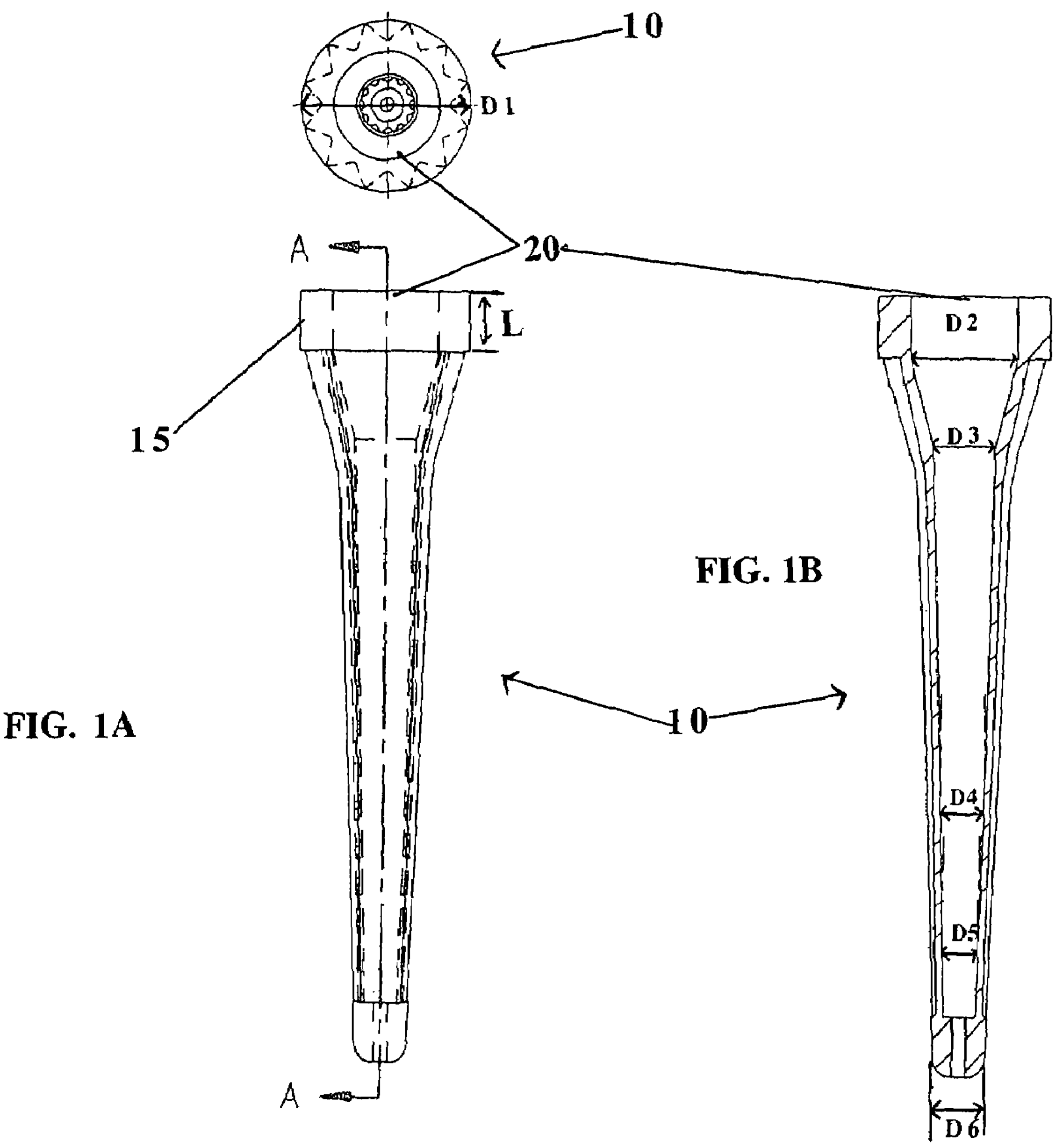
FIG. 1 shows an embodiment of the current invention from above.
FIG. 1A shows an embodiment of the current invention seen from the side.
FIG. 1B shows the invention along section AA.

FIG. 1 shows an embodiment of the current invention as a decorative wand handle (10) seen from above. It will immediately noticed that there is a diameter (D1) taken from the outside of the decorative wand handle (10). In the decorative wand handle (10) is a bore (20) having an initial diameter (D2) at the top of the decorative wand handle (10). This is seen in more detail in other figures.

Figure 2:
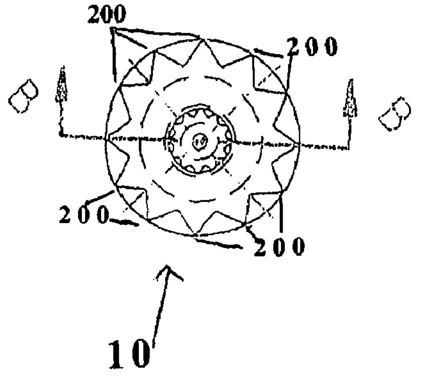
FIG. 2 shows the embodiment of FIG. 1 with section line BB.

FIG. 1A shows the decorative wand handle (10) seen from the side. At the top of the decorative wand handle (10) there is a lip (15) which consists of a disk-like portion of material having a depth of (L). FIG. 2 has a section (AA) seen in more detail in FIG. 1B.

FIG. 1B demonstrates the taper of the bore (20) from the initial diameter (D2). For the disk-like portion (15), the bore is constant at the diameter of (D2). As the bore (20) begins to taper inwardly, there are predetermined diameters (D3), (D4), and (D5) as one proceeds down the bore (20) in the decorative wand handle (10). The diameter (D3) would be a predetermined size to match the size of wands on which the decorative wand handle (10) would be deployed while (D4) and (D5) would be different and smaller diameters, so to match the size of wands on which the decorative wand handle (10) is to be deployed. Specifically, (D3) might be ½ inch and (D4) might be 5/16 inch and (D5) might be ⅜ inch, the size of standard wand handles used on blinds. The outside diameter of the decorative wand handle (10) tapers from the top initial diameter (D1) to the bottom diameter (D6). Most wand handles have a series of raised ridges (200) (seen more clearly in other figures). These provide a decorative appearance but also provide an appropriate gripping surface for someone who wishes to use the wand to manipulate the orientation of the slats on the blinds using the rotary drive mechanism. Consequently, for one embodiment of the decorative wand handle (10) shown in FIGS. 1, 1A, 1B, 2, and 2A there is also be a series of ridges (200) lengthwise on the decorative wand handle (10).

Figure 2A:
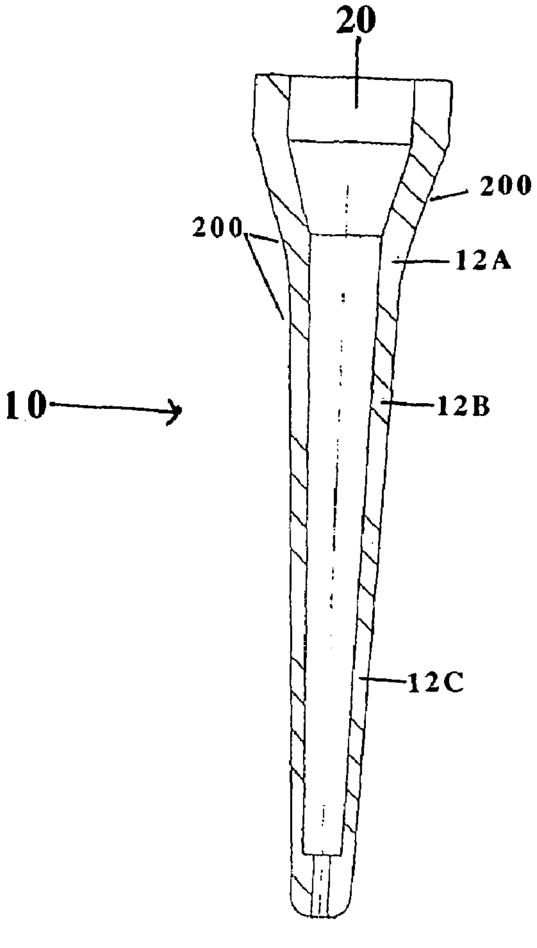
FIG. 2A shows a cut-a-way view of the current invention along line BB of FIG. 3.

FIG. 2 shows a view from the top of the decorative wand handle (10) where the section view (BB) seen in FIG. 2A is along the apex of the raised ridges (200) used in the decorative wand handle (10). These raised ridges (200) are to match the appearance of the ridges on the wand on which the decorative wand handle (10) is affixed, but also to provide a ribbed surface to facilitate use of the decorative wand handle (10) to control the wand.

FIG. 2A is a cut-a-way view of FIG. 2 along line BB. The raised ridges (200) are seen more clearly in the prospective views of a shaded decorative wand handle (10) seen in FIGS. 3 and 5. The design of the ridges (200) provide not only a more pleasing appearance for the decorative wand handle (10) but also provide a gripping point for users. The cut-a-way view of FIG. 1B is along a point between two separate ridges (200) on the decorative wand handle (10). The cut-a-way view shown in FIG. 2A is at the apex of the ridges (200). It can be seen in FIG. 2A that at the height (12A, 12B, 12C) of ridges (200) tapers as the decorative wand handle (10) itself tapers to give the decorative wand handle (10) its appearance as a truncated cone. Consequently, the height (12A) of the ridge (200) is greater than the height (12B) of the ridge (200) and greater still than height (12C). In all views, the decorative wand handle (10) is shown with the bore (20) extending all the way through the decorative wand handle (10) so that there is an open bore at the top tip end of the decorative wand handle (10) as well as an open bore at the bottom where the diameter of the bore is the smallest. However, the end of the decorative wand handle (10) could easily be closed off for a variety of reasons, including the possibility of retaining liquid in the decorative wand handle (10).

Figure 3:
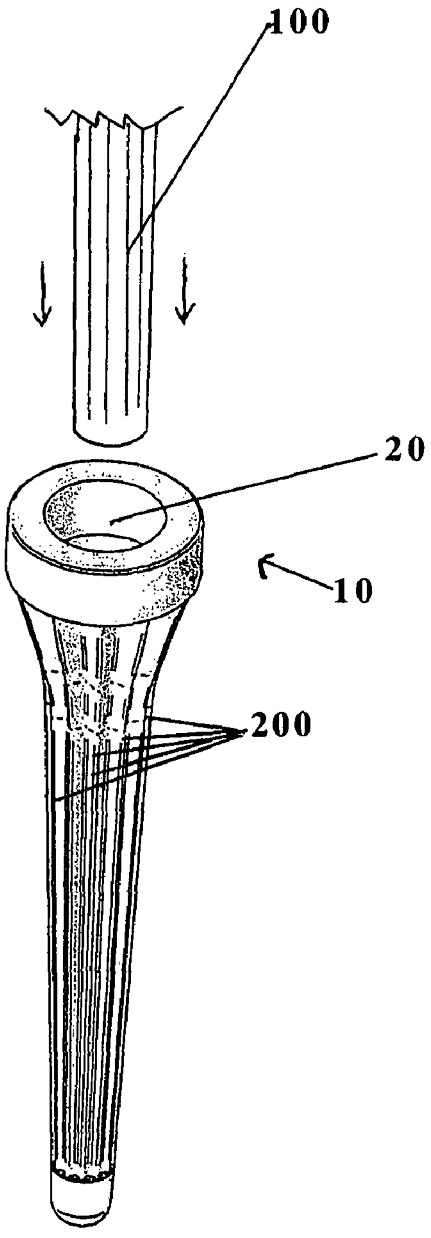
FIG. 3 shows a prospective view a wand controlling a blind ready to be inserted into the current invention.

FIG. 3 shows the decorative wand handle (10) in prospective shaded view with a wand handle (100) positioned above the bore (20) and ready for insertion within the bore (20) of the decorative wand handle (10). The ridges (200) can be clearly seen in this view.

Figure 4:
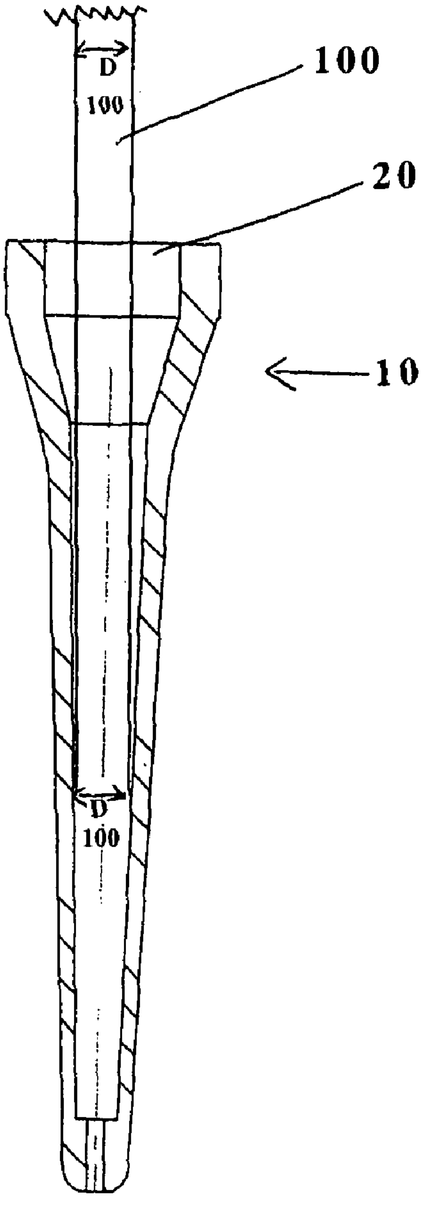
FIG. 4 shows the current invention in cut-a-way with a wand inserted therein.

FIG. 4 shows the decorative wand handle (10) in a cut-a-way view with the wand (100) inserted all the way into the bore (20) to where the diameter (D100) is the same as the bore diameter of the decorative wand handle (10). The wand (100) is wedged within the decorative wand handle (10) so that the decorative wand handle (10) is held on the wand (100) by the frictional force created by the wedging of the wand (100) into the bore (20) diameter (D100).

Figure 5:
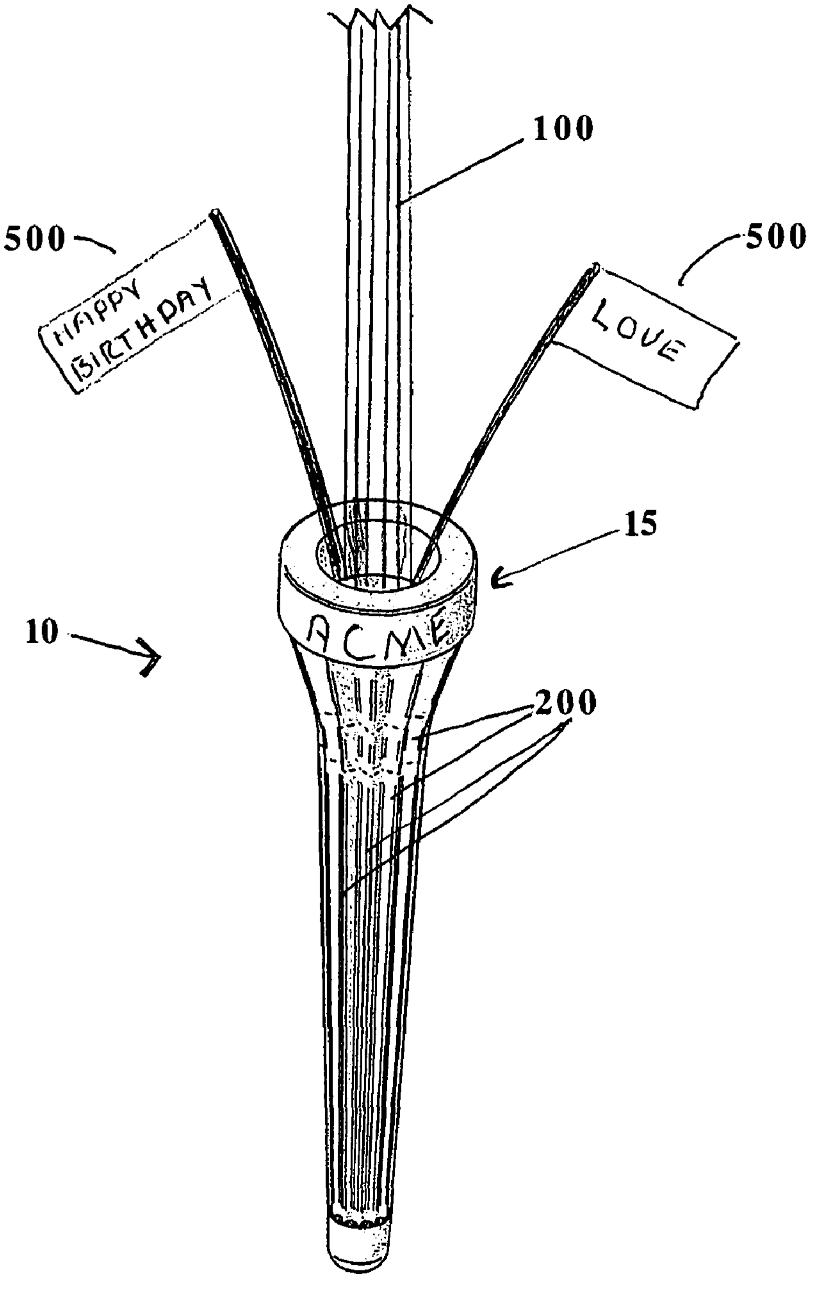
FIG. 5 shows the current invention with decorative items inserted therein.

FIG. 5 shows a wand (100) inserted into the shaded decorative wand handle (10). Small decorative, flexible flags (500) are inserted in the space between the wand (100) and the bore (20) of the wand handle (10). These flags (500) are respectively labeled "Happy Birthday" and "Love." The "Love" flag might be used for Valentine's Day. The birthday flag might be used for the birthday of the owner of the decorative wand handle (10). Additionally, the lip (15) has a exemplar trademark. "Acme" inscribed along the lip (15) to provide promotional opportunities for companies that may wish to distribute the decorative wand handle (10) to customers. Consequently, the decorative wand handle (10) not only serves a functional purpose of providing a ready means of gripping and manipulating the wand (100), but also provides a plurality of decorative options. The wand handle (10) can be designed in such a way as to compliment the decor of the house. A modern house, for example, might have a stainless steel or chrome decorative wand handle (10), where a house decorated in a more traditional fashion might have a wood decorative wand handle (10). The lip (15) on the wand handle (10) provides an opportunity for inscribing material along the lip (15). This could be used for promotional materials by companies or could be used to express the individual taste of the owner of the decorative wand handle (10). The decorative wand handle (10) will ordinarily have the ridges (200) as shown and described in FIGS. 1-5 built along the lengthwise dimension of the decorative wand handle (10). However, need not have that kind of orientation but the surface could be a spiral, raised, dimpled, or a smooth surface. The decorative wand handle (10) could be translucent. It could have colors including reflective bits imbedded in the decorative wand handle (10). It could even have fiber optics or other lights or made of luminescent material making the decorative wand handle (10) easier to see at night and also providing a soft decorative light. Thus, not only does the decorative wand handle (10) perform an important function of providing easier access to and manipulation of the wand (100), but also provides numerous opportunities for an owner to express individual decorative displays.

It will be appreciated by one of skill in the art the variations in the foregoing preferred embodiment may be varied without limiting the underlying inventive concept. The foregoing explanation is by way of illustration and not limitation. The limitations are contained only in the claims which follow.

I claim:

1. An improvement used in combination with a conventional blind control mechanism using a solid one-piece generally cylindrical control wand with a predetermined diameter, mounted for rotational movement, where a user rotates said control wand to adjust orientation of slats on blinds, said improvement comprising:

(a) an elongated piece of a predetermined size with a bore beginning at a first end of said piece, said bore's first diameter at such first end greater than said control wand's predetermined diameter, said control wand being disposed within said bore so as to define a space therebetween; and (b) said bore extending longitudinally into said cylindrical piece and tapering to a second diameter, said second diameter smaller than said control wand's predetermined diameter; and (c) means for fixedly attaching said elongated piece to said generally cylindrical control wand by a functional fit thereby giving an improved control wand mounted for rotational movement with an improved gripping surface larger than said generally cylindrical control wand;

(d) and at least one decorative item disposed within said space;

whereby a user will grip and rotate said elongated piece attached to said control wand to adjust slats on a blind.

2. An improvement of claim 1 wherein said bore beginning at a first end of said piece further comprises for said bore a first constant diameter for a predetermined distance extending into longitudinal dimension of said elongated piece, then beginning at said predetermined distance from said first end, said bore tapers to said second diameter; and means for mounting small decorative items in the inner surface of said bore in said elongated piece between the inner surface of said bore in said elongated piece and said outer surface elongated control wand.

3. An improvement of claim 2 wherein said improvement further comprises that for said elongated piece, said first constant diameter is greater than one-half inch and said predetermined diameter of said generally cylindrical control wand is no more than one-half inch.

4. An improvement of claim 3 wherein said elongated piece has a first lip at said first end of the elongated piece whereby said first lip may be used to display logos or decorative slogans.

5. An improvement of claim 1 wherein said improvement further comprises that said first diameter for said bore in said elongated piece is greater than one-half inch, said predetermined diameter for said generally cylindrical control wand is no more than one-half inch.

6. An improvement of claim 5 wherein said elongated piece has a first lip at a first end of the elongated piece whereby said first lip may be used to display logos or decorative slogans.

7. An improvement of claim 1 wherein said bore continuously tapers from said first end to said second diameter and further comprises means for mounting small decorative items in the inner surface of said bore in said elongated piece between the inner surface of said bore in said elongated piece and an outer surface of said elongated control wand.

8. An improvement of claim 7 wherein said improvement further comprises that for said elongated piece, said first diameter is greater than one-half inch and said predetermined diameter of said generally cylindrical control wand is no more than one-half inch.

9. An improvement of claim 8 wherein said elongated piece has a first lip at said first end of the elongated piece whereby said first lip may be used to display logos or decorative slogans.

* * * * *